United States Patent [19]
Lindner
[11] 4,238,021
[45] Dec. 9, 1980

[54] END SWITCH FOR A SHAFT DRIVEN THROUGH A LARGE ANGLE OF ROTATION

[75] Inventor: Adolf Lindner, Rottendorf, Fed. Rep. of Germany

[73] Assignee: Siemens Aktiengesellschaft, Munich, Fed. Rep. of Germany

[21] Appl. No.: 887,136

[22] Filed: Mar. 16, 1978

[30] Foreign Application Priority Data

Mar. 31, 1977 [DE] Fed. Rep. of Germany ....... 2714493

[51] Int. Cl.[3] ........................ F16D 43/26; F16D 71/00

[52] U.S. Cl. ................................ 192/141; 192/56 R; 192/143

[58] Field of Search .................... 192/143, 142 R, 141

[56] References Cited

U.S. PATENT DOCUMENTS 1,448,673 3/1923 Norvell .......................... 192/141 X
1,481,283 1/1924 Daniel ................................ 192/141
2,512,514 6/1950 Adell ............................... 192/141 X

*Primary Examiner*—Rodney H. Bonck
*Attorney, Agent, or Firm*—Kenyon & Kenyon

[57] ABSTRACT

An end switch for use with a shaft and a drive which drives the shaft through a relatively large number of 360° angular rotations associated with an end position wherein the end switch is provided with a switching member and with a spindle drive means responsive to the drive for causing an end face of the switching member to be brought into engagement with a contact of a stationary switch at the end of the rotation of the shaft. In accordance with the invention, the spindle drive means moves the switching member axially thereto during a first portion of the shaft rotation and tangentially thereto during the remaining portion of the shaft rotation, the former portion being larger than the latter portion.

17 Claims, 7 Drawing Figures

END SWITCH FOR A SHAFT DRIVEN THROUGH A LARGE ANGLE OF ROTATION

BACKGROUND OF THE INVENTION

1. Field of the Invention

The invention relates to an end switch for use with a shaft and a drive for driving the shaft through relatively large number of 360° angular rotations wherein the switch includes a spindle-like drive means responsive to the shaft for moving a switching member in guided fashion parallel thereto so as to bring a stop face of the member into engagement with a contact of a stationary switch at the end of the shaft rotation.

2. Description of the Prior Art

German Auslegeschrift No. 25 11 603 discloses an end switch of this type wherein during the entire angular rotation of the shaft the switching member is guided to its point of impact with the contact of a stationary switch analogously to a nut running on a threaded spindle. With this arrangement, a given switching-off point is realized through the use of a pinion which can be disengaged axially from the outside by means of a loose tool and which is sitated between the threaded spindle and the drive of the shaft for releasing the switch contact. In the adjustment process, a desired end position is approached by the drive and at the desired position of the driven shaft, the threaded spindle is engaged again.

In another known end switch disclosed in German Offenlegungsschrift No. 25 12 102, the entire angular rotation of the driven shaft is reduced at maximum, via a multistage spur gear reduction box, to a single revolution of at least one cam. In particular, the output of the reduction box is coupled via a driving disc to the cam, the cam being adjustably settable in its position relative to the driving disc from the outside via a setting pin built into the end switch.

It is an object of the present invention to provide an end switch of the above type which is highly accurate in spite of having to respond to a relatively large number of (i.e., at least 60) 360° angular shaft rotations.

SUMMARY OF THE INVENTION

In accordance with the principles of the present invention, the above and other objectives are realized in an end switch of the above type by forming the spindle drive means so that in moving the switching member to a position whereat its stop face engages the contact of the stationary switch at the end of the angular rotation of the shaft, the switching member is moved axially relative to the drive means during a first portion of the angular rotation and is moved tangentially thereto during the remaining portion of the rotation, the former portion being larger than the latter.

Thus, with the present invention, in spite of the large number of angular shaft rotations, a significant degree of accuracy is realized through the combined axial movement of the switching member, which provdes a large step-down ratio between a given number of angular rotations of the shaft and the corresponding axial travel of the switching member, and the immediately following tangential movement thereof, which provides a highly accurate translation of a given angular rotation of the shaft.

In one particular embodiment of the invention to be disclosed hereinafter, the spindle drive means comprises at least one switching cylinder and means for connecting the cylinder in driving relationship with the shaft drive means. The switching cylinder is provided at one end with an axially projecting stop cam associated with the end position and at which a coil spring terminates. The latter coil spring is concentrically arranged in fixed driving connection with the switching cylinder. It is further arranged in guided driving connection with the switching member such that during rotation of the switching cylinder it moves the switching member parallel to the axis of the cylinder, whereby the switching member is brought to and engaged by the stop cam and is immediately pushed thereby so that its stop face is brought into contact with the contact of the stationary switch.

The aforesaid embodiment of the invention permits a simple, direct transition between the axial movement and the tangential movement of the switching member and, hence, a structure which is advantageous from a production standpoint. Furthermore, the embodiment is further advantageous, since a simple coil spring is used to increase the step-down ratio between the angular rotation range of the shaft and the axial travel of the switching member. Moreover, where the angular rotation range is given, a shortening of the spindle-like drive, for example, as compared to a spindle provided with a thread, is possible.

The end switch of the present invention can be adjusted with a setting accuracy of, for example, 10° (relative to the output shaft), using a known disengageable clutch arranged between the spindle-like drive means and the drive of the shaft. In a further aspect of the invention, the aforesaid clutch can be formed as a spring loaded detent clutch which when disengaged permits the switching cylinder and with it, its stop cam, to be rotated relative to the shaft and which when re-engaged secures the fine adjustment so made in a force- and/or form-locking manner. To this end, the clutch is provided with serrations each of which corresponds to the smallest desired rotation angle for fine adjustment (10° referred to the output shaft). Moreover, to permit such setting to be made without special tools and, in particular, to facilitate adjustment when the end switch is installed in a difficult-to-get-at place, the switch is further provided with a setting lever which can disengage the detent clutch from the outside, is built into the housing of the end switch, and which can rotate at least one switching cylinder.

BRIEF DESCRIPTION OF THE DRAWING

The above and other features and aspects of the present invention will become more apparent upon reading the following detailed description in conjunction with the attached drawings, wherein.

DETAILED DESCRIPTION

Figure 1:
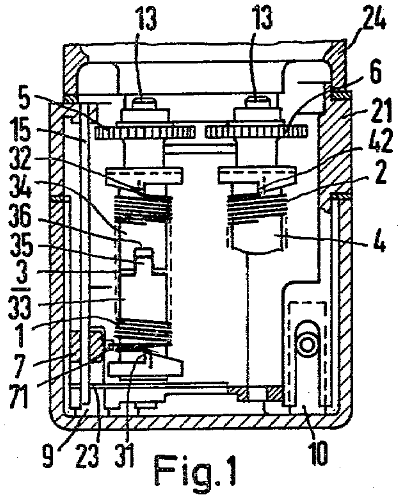
FIG. 1 shows an axial, longitudinal cross section taken parallel to a first side of an end switch in accordance with the principles of the present invention.

FIG. 1 shows an end switch comprising a housing which is advantageously divided into two housing halves 21 and 22 for manufacturing and assembly reasons. Included in the housing are two switching cylinders 3, 4 which are rotatably supported on respective switching cylinder shafts 13 each of which is fastened to the housing. Each switching cylinder 3, 4 is associated with a different end position or direction of rotation of, for example, a Venetian blind or a roller shutter. More particularly, each switching cylinder is responsive to one or the other directions of rotation of the gear box output shaft 11 which drives the blind or shutter and in response to its respective rotations accurately stops the shaft when the blind or shutter arrives at its associated end position.

The switching cylinders 3, 4 are in driving connection, via a spring-loaded detent clutch 17 and intermediate gears 5, 6, with a gear 14 which is firmly connected to the gear box output shaft 11. Moreover, the switching cylinder 3, 4 have, at least at their ends associated with their respective end positions, axially projecting stop cams of which only cam stop 31 is visible in the drawing. Coil springs 1 and 2 are also provided and are arranged concentrically with the switching cylinders 3 and 4, respectively, and in firm driving connection therewith. More particularly, opposite ends of the coil springs 1 and 2 are axially pushed in a form-locking manner into openings in the stop cams 31, 32 42 of cylinder 3 as well as the unillustrated camstop of cylinder 4.

Figure 6:
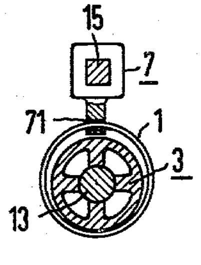
FIG. 6 shows in cross-sectional view, the connection of the switching member and the coil spring of the end switch of FIG. 1.

As can be seen particularly from FIG. 6, a switching member 7 is arranged in driving connection with the coil spring 1. The coil spring 1 displaces or guides the switching member 7 axially along a guide rod 15 acting as a slider when the switching cylinder 3 rotates. To facilitate this displacement, the coil spring 1 is threaded into an opening 71 of the switching member 7. Hence, upon being rotated with the switching cylinder 3, the spring 1 takes along the switching member 7 which slides on the guide rod 15. The switching member 7 is guided by the coil spring 1 until it strikes the stop cam 31 at which time the end position of the roller or blind to which the cam corresponds has been reached. The stop cam 31, in turn, moves the switching member 7 and the guide rod 15 resiliently in the direction of rotation of the switching cylinder 3, so that the stop face of the switching member 7 hits a plunger 91 of a stationary switch contact 9. The switch 9 is thereby actuated and stops the drive motor driving the shaft 11 and, thereby, the roller or blind.

Figure 4:
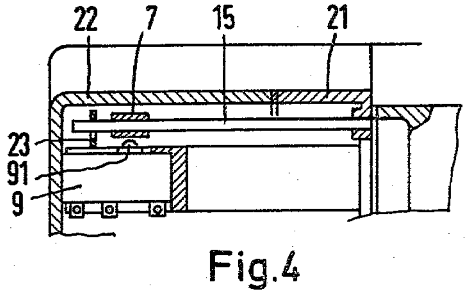
FIG. 4 shows in fragmentary view, an axial, longitudinal cross section taken through the switching member of the end switch of FIG. 1.

As can be seen most clearly from FIG. 4, the resilient movement of the switching member 7 and the guide rod 15 is realized in a relatively simple manner by firmly clamping the upper end of the guide rod 15 to the housing 21 and by arranging the lower end of the rod so as to be freely movable in a direction toward the switch 9 in an opening of a guide member 23. When the pressure of the stop cam 31 is removed, the guide rod 15 and the switching member 7 are automatically removed from the plunger 91 and assume the position indicated in FIG. 4.

Advantageously for producting and assembly purposes, the switching cylinders 3, 4 are axially divided. Thus, as shown, the switching cylinder 3 comprises two switching cylinder members 33, 34. As is also shown, the inner facing ends of the switching cylinder members 33, 34 are arranged to form a tangential driving joint and to have axial movability. Thus, the switching cylinder member 33 is provided at its inner end with an axially projecting tongue 35 which is inserted in a corresponding axial slot 36 provided in the inner end of the switching cylinder member 34. An axial compression spring 12 is arranged in the interiors of the two switching cylinder members 33 and 34 and it pushes the members so that their outer ends rest against stops. More particularly, the outer end of the switching cylinder member 33 rests against a stop formed by a snap ring inserted in a cut in the switching cylinder shaft 13 and the outer end of the switching cylinder member 34 rests against a stop formed by the lower portion of the intermediate gear 5.

Advantageously, the inner bores of the switching cylinder members 33 and 34 through which the shaft 13 extends are enlarged in the vicinity of the inner ends of the members. The axial-compression spring 12 is arranged in these enlarged bore regions and therein extends radially between the switching cylinder members and the switching cylinder shaft, being attachable over the latter. The switching cylinder members 33, 34 thus rest on the switching cylinder shaft 13 directly and with their entire inner circumference only in the vicinity of their outer ends.

Figure 3:
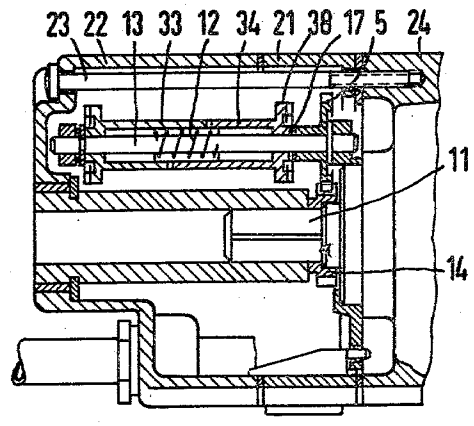
FIG. 3 illustrates an axial, longitudinal cross section taken parallel to a second side of the end switch of FIG. 1.

As can be seen from FIG. 3 and, in particular, from FIG. 6, the switching cylinder members 33, 34 are further provided at positions between the stop cams 31, 32 and the ends of the axial compression spring 12, with axial ribs which support the switching cylinder members on the switching cylinder shaft 13. These ribs also serve at the same time as a support surface for the ends of the axial-compression spring 12.

For the purpose of fine setting or adjustment of the point at which the cam 31 causes the switching member 7 to engage the plunger 91 of the switch 9, and, hence for the setting or adjustment of the corresponding end position of the roller or blind, the aforementioned detent clutch 17 is provided for connecting the shaft 11 to the switching cylinders 3 and 4. Use of such a clutch permits disengagement of the cylinders from the shaft, after which the cylinders 3 and 4 and with them their stop cams of which cam 31 only is visible can be rotated relative to the shaft to make the desired adjustment. Thereafter, by re-engagement of the clutch, the adjustment can be secured in place.

Figure 5:
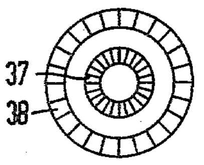
FIG. 5 illustrates a top view of a clutch disc of the detent clutch of the end switch of FIG. 1.

To facilitate this process, the outer end of the switching cylinder member 34, at which end the stop cam 32 is located, is provided with an embossing in the form of serrations 37 (plane serrations), as can be seen from FIG. 3 and, in particular, from FIG. 5. The serrations 37 correspond to and engage further serrations arranged on the adjacent end face of the intermediate gear 5. These serrations which act to form the detent clutch 17 are forced into engagement by the axial-compression spring 12 which pushes the switching cylinder member 34 against the lower end of the intermediate gear 5, the latter gear being secured on the switching cylinder shaft 13 in the axial direction at the right end. It should be noted that in place of the detent clutch 17, a purely frictionally-connected, spring-loaded clutch may also be provided if step-wise adjustability can be dispensed with and continuous setting is to be achieved.

The detent clutch 17 also serves at the same time as an overload protection against the danger of breakage in both directions of rotation. If, for example, the switching member 7 hits the stop cam 32, which stop cam is not associated with an end position, the detent clutch 17 simply clicks over if the switching cylinder 3 continues to rotate, and no component of the drive unit can break.

Figure 7:
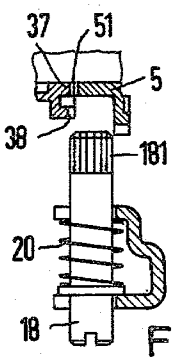
FIG. 7 illustrates in cross-sectional view, the setting lever for disengaging the detent clutch of the end switch of FIG. 1.

To enable setting of the fine adjustment in a relatively simple manner, which is highly desirable if the end switch is to be installed in a poorly accessible place, a setting lever 18 is built into the housing 21. The lever 18 permits disengagement of the detent clutch 17 from the outside and at least the rotation of the switching cylinder 3. The setting lever 18 is provided with a slotted end and with a portion extending therefrom which projects into the interior of a support part (not specifically illustrated) in the end switch housing 21. In particular, the aforesaid portion of the lever projects through an opening in the easily accessible underside of the end switch housing 21, so that it can be pushed upward against the spring pressure of a surrounding spring 20 by means of a screwdriver inserted into the slotted lever end. Upward movement of the setting lever 18 against the pressure of the spring 20 causes the upper radially serrated end 181 of the lever to mesh with corresponding further serrations 38 provided at the outer circumference of the outer end of the switching cylinder member 34. The top face of the end 181, in turn, pushes against the side of the intermediate gear 5 so as to disengage the latter, as can be seen in detail in FIG. 7. Turning the setting lever 18 will now cause the switching cylinder member 34 to rotate step-wise or in jumps due to the engagement of the serrated end 181 and the serrations 38, if the self-locking intermediate gear 5 is standing still. In this manner, the switching cylinder 3 and its cam 31 can thus be rotated for setting or adjustment relative to the drive shaft 11.

Figure 2:
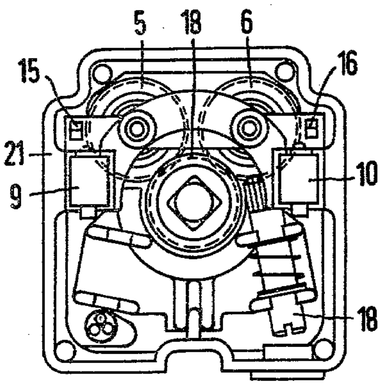
FIG. 2 is a view of the front end of the end switch of FIG. 1.

As is evident from FIGS. 1 and 2, the switching cylinders, the coil spring, the switching members, stop cams and the like are advantageously of the same design independently of their relationship to the respective spindle-like drive. Thus, guiderod 16 carries a switching member like switching member 7, but which cannot be seen in the drawings, and which cooperates with a similar stationary switch contact 10. Moreover, as above-noted, to simplify production and assembly further, the end switch housing is divided into two housing halves 21 and 22. In the assembly, the essential parts of the end switch are first mounted on the first housing part 21 and, thereafter, the second housing part 22 is put in place. The entire unit is then bolted via screws 23 to the adjacent reduction gear housing of the drive unit of the shutter or roller.

What is claimed is:

1. An end switch for use with a shaft being driven in rotation through a substantial angle to an end position, comprising:

a switching member having a stop surface adapted to engage a contact of a stationary switch;

spindle-like means adapted to be driven in rotation with said shaft for moving said switching member so as to bring said stop surface into engagement with said contact at the end of said rotation of said shaft, said spindle-like means moving said member axially relative thereto during a first portion of said rotation and tangentially thereto during the remaining portion of said rotation, said first portion being larger than said remaining portion; and means for maintaining said switching member in operative engagement with said spindle-like means during said tangential relative motion.

2. An end switch in accordance with claim 1 wherein: said angle corresponds to a substantial number of 360° angular rotations.

3. An end switch in accordance with claim 1 wherein: said spindle-like means comprises:

at least one switching cylinder, said switching cylinder having at one end an axially projecting stop cam associated with said end position;

means for connecting said switching cylinder in driving relationship with said shaft;

a coil spring concentrically arranged with respect to said switching cylinder and ending at said cam, said spring being in driving relationship with said switching member such that the switching member is moved during rotation of the switching cylinder along said spring parallel to the axis of said switching cylinder to the end of said spring and said switching member is engaged by said cam and pushed thereby so said stop surface contacts said contact.

4. An end switch in accordance with claim 3, wherein:

said switching cylinder is divided axially into first and second switching cylinder members.

5. An end switch in accordance with claim 4 wherein: the facing ends of said first and second switching cylinder members are axially insertable in one another so as to form a tangential driving connection with axial movability.

6. An end switch in accordance with claim 6, wherein:

said one end at which said stop cam is arranged is the end of said first switching cylinder member opposite said facing end of said first switching cylinder member;

said end switch further includes a further stop cam arranged at the end of said second switching cylinder member opposite said facing end of said second switching cylinder member; and the respective ends of said coil spring rest against and are in driving connection with said stop cam and said further stop cam.

7. An end switch in accordance with claim 4, wherein:

said switch further comprises stops and an axial compression spring arranged to push said first and second switching cylinder members axially such that said ends thereof opposite said facing ends are against said stops.

8. An end switch in accordance with claim 7 wherein: said switching cylinder members have an axial shaft hole extending therethrough; and said end switch further comprises a housing and a switching cylinder shaft extending through said hole for rotatably supporting said switching cylinder members, said shaft being fixedly arranged in said housing.

9. An end switch in accordance with claim 8 wherein: said shaft hole is enlarged in the vicinity of said facing ends of said switching cylinder members such that said compression spring can be pushed over said cylinder shaft in this region so as to be radially between said cylinder members and said shaft; and said switching cylinder members are supported on said shaft over their entire circumference only in the vicinity of said ends thereof opposite said facing ends.

10. An end switch in accordance with claim 4 wherein said shaft is driven in rotation in either direction through a substantial angle to different end positions and wherein said end switch further includes:

a further switching member having a further stop surface adapted to engage a further contact of a stationary switch; and further spindle-like means adapted to be driven in rotation with said shaft for moving said further switching member to bring said further stop surface into engagement with said further contact at the end of rotation of said shaft in the opposite direction, said further spindle-like means moving said further switching member axially relative thereto during a first portion of said opposite rotation and tangentially thereto during the remaining portion of said opposite rotation, said first portion being larger than said remaining portion, said further spindle-like drive means including:

a further switching cylinder, said further switching cylinder having at one end an axially projecting further stop cam associated with said further end position;

means for connecting said further switching cylinder in driving relationship with said shaft;

a further coil spring concentrically arranged with respect to said further switching cylinder and ending at said further cam, said further spring being in driving relationship with said further cylinder and guiding relationship with said further switching member such that said further switching member is moved during rotation of said further switching cylinder along said spring parallel to the axis of said further switching cylinder to said end thereof and said further switching member is engaged by said further cam and pushed thereby so said further stop surface contacts said contact.

11. An end switch in accordance with claim 10 wherein:

said switching cylinder and said further switching cylinder are of identical construction;

said stop cam and said further stop cam are of identical construction;

said coil spring and said further coil spring are of identical construction.

12. An end switch in accordance with claim 3 wherein:

said end switch further includes a guide rod for slidably supporting said switching member, said guide rod extending parallel to said switching cylinder and being supported such that it moves resiliently in the direction of rotation of said cylinder when said switching member is moved tangentially.

13. An end switch in accordance with claim 3 wherein:

said end switch further includes a disengageable clutch connected between said switching cylinder and said shaft;

means for rotating said switching cylinder relative to said shaft after said clutch is disengaged so as to adjust the engagement of said switching member and said stop cam; and said clutch including means for securing said cylinder after said clutch is engaged in one of a force and a form-locking manner.

14. An end switch in accordance with claim 13 wherein: said clutch is a spring-loaded detent clutch and has serrations corresponding to the smallest desired angular rotation for fine adjustment.

15. An end switch in accordance with claim 14 wherein:

said end switch further includes a setting lever extending from the outside into the end switch housing and arranged to engage said detent clutch for disengaging same and to rotate said switching cylinder relative to said shaft.

16. An end switch in accordance with claim 13 wherein:

said end switch further comprises an axial compression spring for spring-loading said detent clutch.

17. An end switch in accordance with claim 13 wherein:

said clutch is arranged to provide overload protection.

* * * * *